(12) United States Patent
Kichiji et al.

(10) Patent No.: US 6,355,999 B1
(45) Date of Patent: Mar. 12, 2002

(54) TWIN-SHAFT CONCENTRIC MOTOR

(75) Inventors: Teruo Kichiji; Tadatomo Kimura, both of Nagano-ken (JP)

(73) Assignee: Tamagawa Seiki Kabushiki Kaisha, Nagano (JP)

( * ) Notice: Subject to any disclaimer, the term of this patent is extended or adjusted under 35 U.S.C. 154(b) by 0 days.

(21) Appl. No.: 09/613,839

(22) Filed: Jul. 11, 2000

(30) Foreign Application Priority Data

Apr. 18, 2000 (JP) ......................................... 2000-116598

(51) Int. Cl.[7] .............................................. H02K 17/44
(52) U.S. Cl. ........................................ 310/112; 310/114
(58) Field of Search ................................ 310/112, 116, 310/261, 266, 88, 68 B; 901/23

(56) References Cited

U.S. PATENT DOCUMENTS

| | | | | |
|---|---|---|---|---|
| 4,523,447 A | * | 6/1985 | Sticht et al. .................. | 72/144 |
| 4,749,898 A | * | 6/1988 | Suzuki et al. ................ | 310/114 |
| 4,782,257 A | * | 11/1988 | Secher et al. ................ | 310/114 |
| 5,525,851 A | * | 6/1996 | Kumamoto et al. ......... | 310/114 |
| 5,554,903 A | * | 9/1996 | Takara ......................... | 310/266 |
| 5,572,018 A | * | 11/1996 | Taniguchi et al. ...... | 250/231.14 |
| 5,717,264 A | * | 2/1998 | Hadano ....................... | 310/75 D |
| 5,720,590 A | * | 2/1998 | Hofmeister ............... | 414/744.5 |
| 5,793,136 A | * | 8/1998 | Redzic ......................... | 310/114 |
| 5,914,548 A | * | 6/1999 | Watanabe et al. ............. | 310/88 |
| 6,049,152 A | * | 4/2000 | Nakano ....................... | 310/114 |
| 6,297,576 B1 | * | 10/2001 | Yang .......................... | 310/266 |

FOREIGN PATENT DOCUMENTS

| | | | |
|---|---|---|---|
| JP | 409312957 | * | 12/1997 |
| WO | 9423911 | * | 10/1994 |

* cited by examiner

Primary Examiner—Joseph Waks
(74) Attorney, Agent, or Firm—Sughrue Mion, PLLC

(57) ABSTRACT

A twin-shaft concentric motor includes first and second stators arranged concentrically to each other; and first and second rotors formed between the first and second stators, the rotors being rotatable independently of each other. The twin-shaft concentric motor may also include first and second stator partition walls and first and second rotor partition walls for maintaining a vacuum side and an atmospheric side separated, respectively, so that the stators are located under atmospheric pressure while the rotors are located under vacuum pressure.

18 Claims, 3 Drawing Sheets

TWIN-SHAFT CONCENTRIC MOTOR

BACKGROUND OF THE INVENTION

1. Field of the Invention

The present invention relates to a twin-shaft concentric motor, and specifically to a novel improvement for miniaturization and space saving by coaxially aligning a pair of motors to reduce the shaft length.

2. Description of the Related Art

As the type of a conventional twin-shaft motor, a motor structure shown in FIG. 1 is disclosed in WO94/23911 according to PCT Application, for example.

That is, as shown in FIG. 1, in a case 1, first and second motors 2 and 3 are arranged to be laid up in the axial direction. A first rotor 4 of the first motor 2 and a second rotor 5 of the second motor 3 are respectively connected to first and second members 6 and 7 disposed in the upper part.

Therefore, the members 6 and 7 can be independently operated by independent rotation of each of the motors 2 and 3.

Since the conventional twin-shaft motor is structured as above, the following problem has been involved.

That is, since the motors are arranged in series to be laid up in the axial direction, the longitudinal length increases so that miniaturizing cannot be achieved by reducing the shaft length.

SUMMARY OF THE INVENTION

Accordingly, it is an object of the present invention to solve the above-mentioned problem, and in particular to provide a twin-shaft concentric motor for achieving miniaturization and space saving by coaxially aligning a pair of motors to reduce the shaft length.

A twin-shaft concentric motor according to the present invention comprises first and second stators arranged concentrically to each other; and first and second rotors formed between the first and second stators and being rotatable independently of each other. The twin-shaft concentric motor may further comprise first and second stator partition walls and first and second rotor partition walls for maintaining a vacuum side and an atmospheric side separated, respectively, so that the stators are located under atmospheric pressure while the rotors are located under vacuum pressure. Also, in the twin-shaft concentric motor, a permanent magnet may be provided on each surface of the rotors. Furthermore, the twin-shaft concentric motor may further comprise first and second detecting means for independently detecting the rotational angle of each of the rotors, wherein the first and second detecting means may be formed of code plates disposed in each of the rotors and sensors respectively opposing each of the code plates, and wherein the code plates and the sensors may form magnetic encoders. Preferably, the code plates are made of a ferromagnetic material and have anticorrosive coating formed on the surfaces thereof, and a hollow portion is formed in the axial center of a case supporting the stators.

DESCRIPTION OF THE PREFERRED EMBODIMENT

Figure 1:
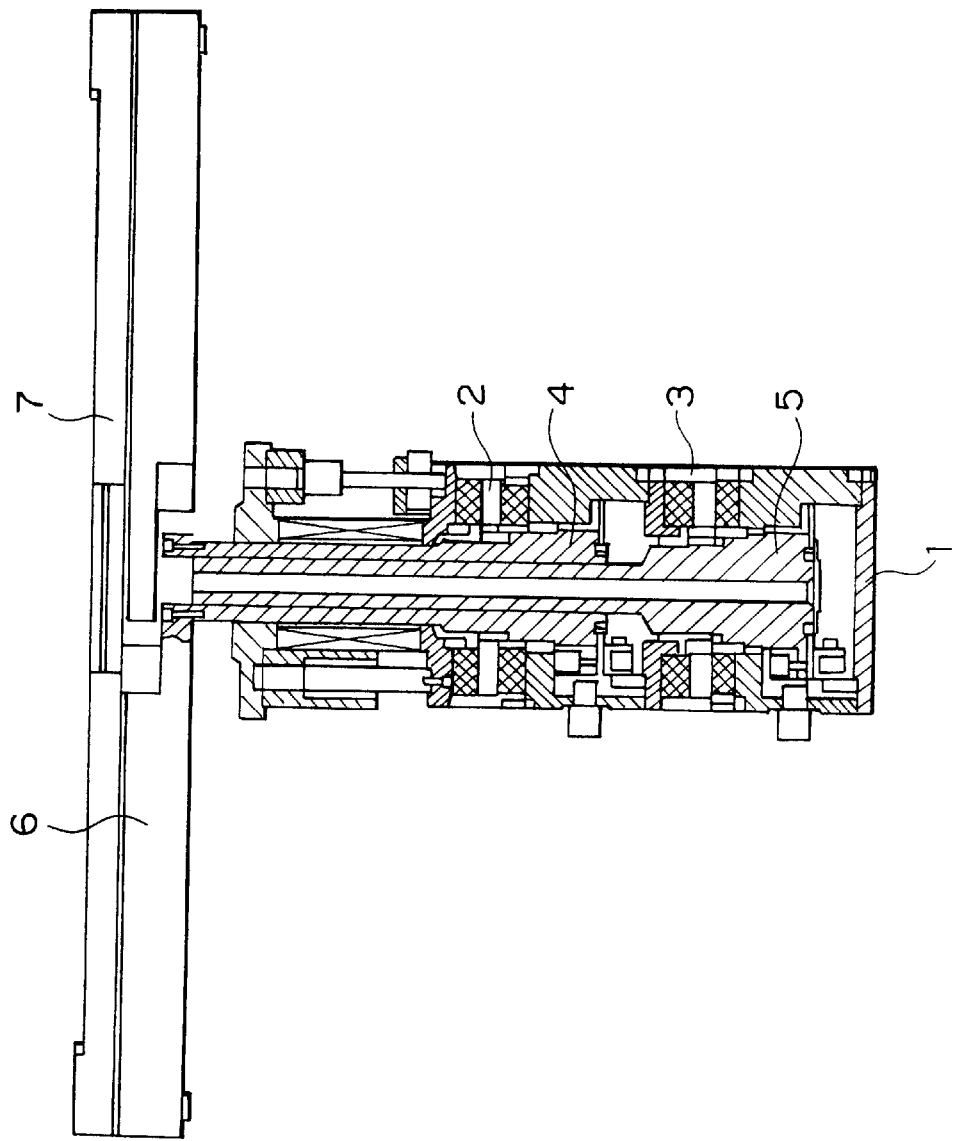
FIG. 1 is a sectional view showing a structure of a conventional twin-shaft concentric motor.

A preferred embodiment of a twin-shaft concentric motor according to the present invention will be described below with reference to the drawings. In addition, the description will be made while like reference characters designate like portions common to those of the conventional example.

Figure 2:
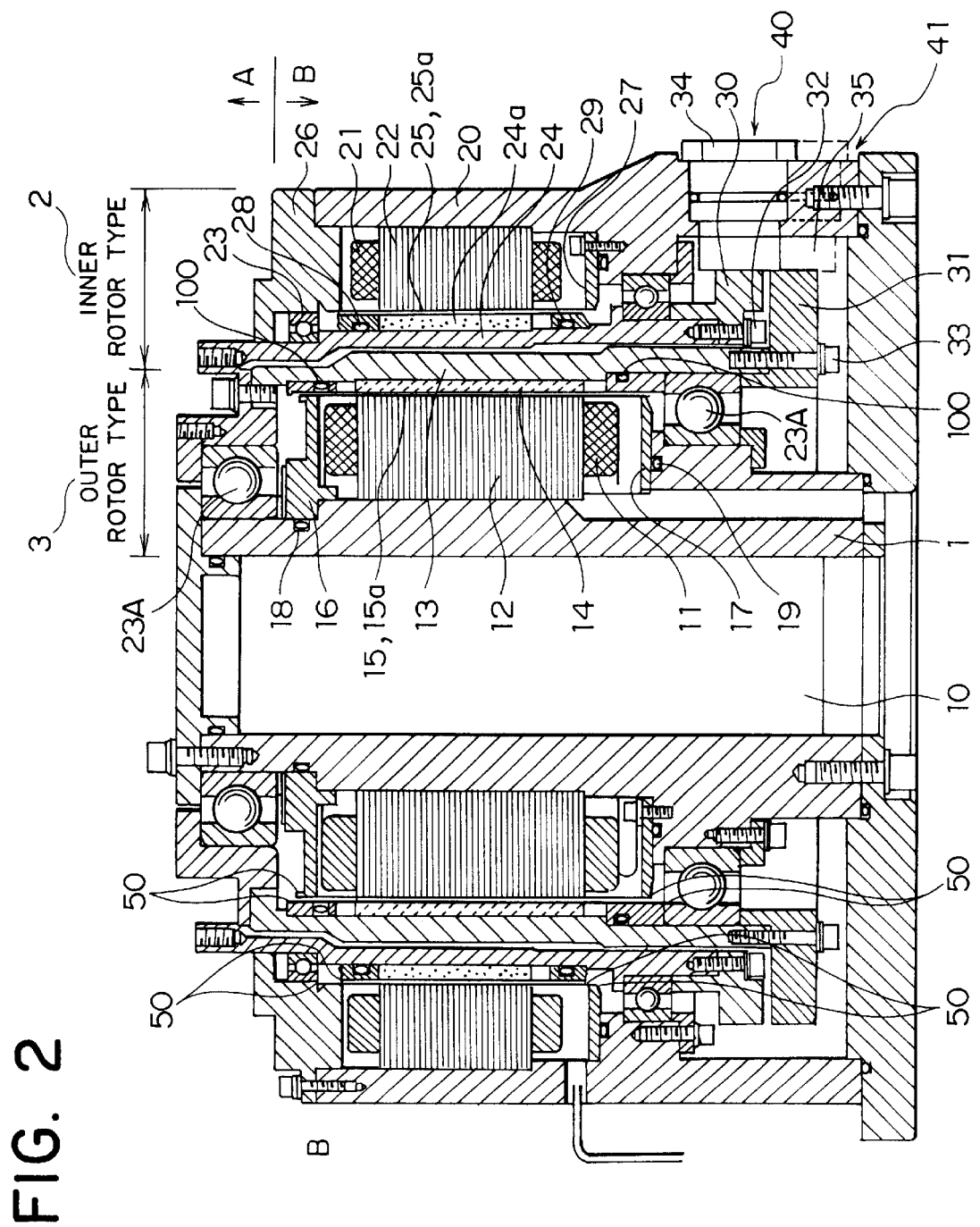
FIG. 2 is a sectional view of a twin-shaft concentric motor according to the present invention.
Figure 3:
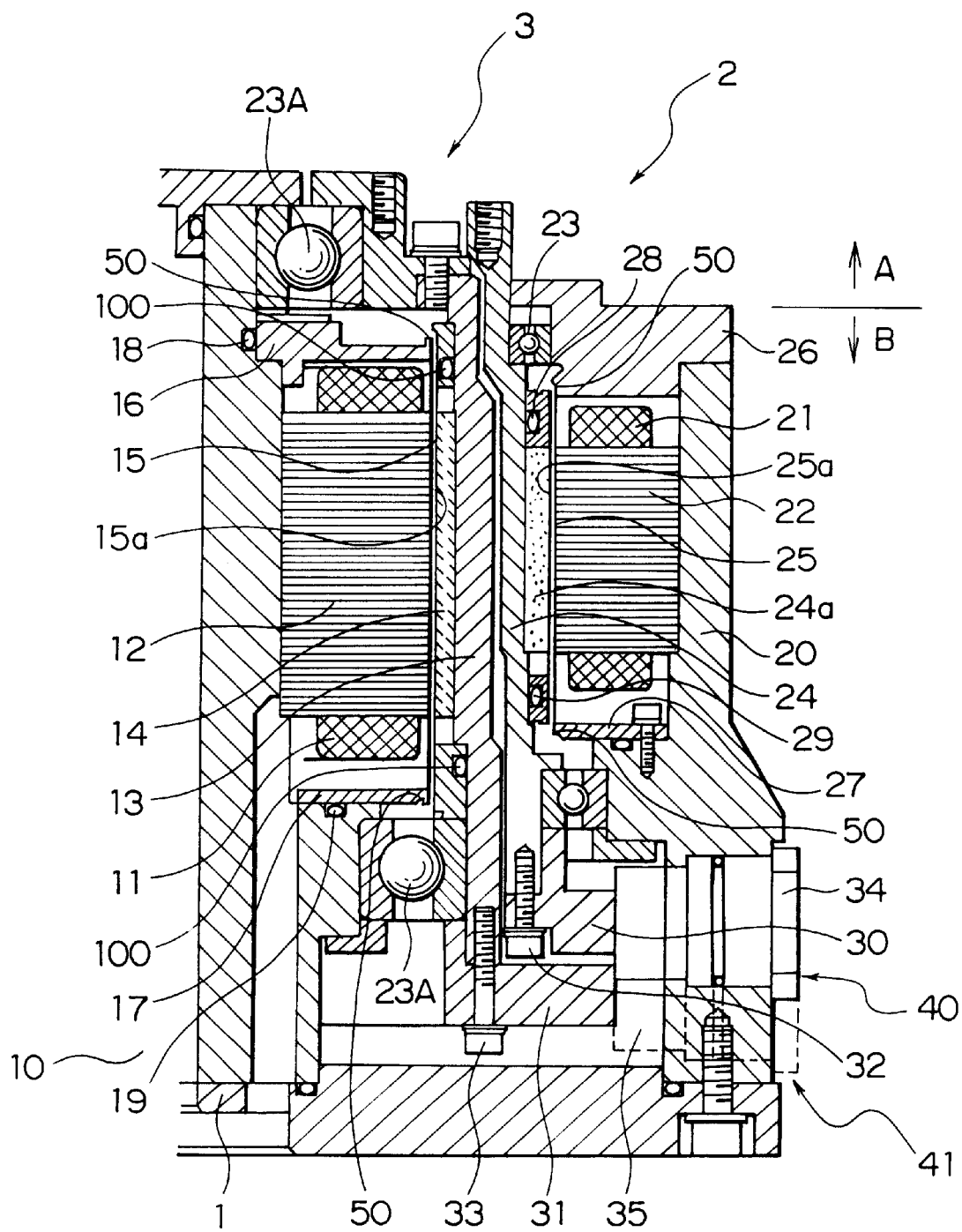
FIG. 3 is an enlarged sectional view of essential parts of the twin-shaft concentric motor shown in FIG. 2.

As shown in FIGS. 2 and 3, a case 1 has a hollow portion 10 in the axial center, and outside the hollow portion 10, an outer-rotor-type second motor 3 and an inner-rotor-type first motor 2 are concentrically arranged.

The second motor 3 disposed inside inner than the first motor 2 is formed of a ring-shaped second stator 12 disposed toward the case 1 and having a stator coil 11 wound therearound and a ring-shaped second rotor 13 rotatably arranged in the case 1 via second bearings 23A.

While a second permanent magnet 14 is disposed on the internal surface of the second rotor 13, a ring-shaped second rotor partition wall 15a and a second stator partition wall 15 are respectively arranged inside the second rotor 13 and outside the second stator 12. Both ends of the second rotor partition wall 15a are sealed to be airtight by both ends of the second rotor 13 via sealing members 100 while both ends of the second stator partition wall 15 are brought into intimate contact with fitting members 16 and 17 on both ends of the second stator 12, so that the second rotor 13 and the second stator 12 are separated with each other so as to be positioned in a vacuum region "A" and an atmospheric region "B", respectively.

Inside a ring-shaped external wall 20 disposed in the extreme exterior and extended from the case 1, a first stator 22 having a stator coil 21 is arranged. On first bearings 23 disposed inside the external wall 20, a first rotor 24 disposed close to the exterior of the second rotor 13 and having a first permanent magnet 24a is rotatably mounted.

On the internal surface of the first stator 22, a ring-shaped first stator partition wall 25 is disposed. Both ends of the first stator partition wall 25 are brought into intimate contact with fitting members 26 and 27 disposed at both ends of the external wall 20 while a ring-shaped first rotor partition wall 25a is brought into intimate contact with the exterior of the first rotor 24 via sealing members 28 and 29, so that the first rotor 24 and the first stator 22 are separated with each other so as to be positioned in the vacuum region "A" and the atmospheric region "B", respectively.

The rotors 24 and 13 are concentrically arranged close to each other. At one end of each of the rotors 24 and 13, ring-shaped first and second code plates 30 and 31 having anticorrosive coating formed thereon and extending in the radial direction perpendicular to the axis of the rotors 24 and 13 are respectively fixed with screws 32 and 33.

The code plates 30 and 31 oppose first and second sensors 34 and 35 disposed in the external wall 20 of the case 1, respectively. Each of the code plates 30 and 31 and each of the sensors 34 and 35 form first and second detecting means 40 and 41 for detecting rotation and the rotational angle of each of the rotors 24 and 13, respectively.

When each of the code plates 30 and 31 is a gear, a magnetic encoder can be thereby formed while when a rotating disc, a known optical encoder can be thereby formed although the sensors 34 and 35 are slightly changed in shape.

Both ends of each of the partition walls 25 and 15 are welded to each of the fitting members 26, 27, 16, and 17 by welded portions 50, respectively while each of the partition walls 25a and 15a are brought into intimate contact with each of the sealing members 28, 29, and 100, respectively, so that the motor can be divided into the vacuum region "A" and the atmospheric region "B" at the upper end of the case 1 shown in FIG. 2. When the case 1 is used in a vacuum atmosphere (vacuum chamber, etc.), for example, positions around the rotors 24 and 13, and the code plates 30 and 31 are the vacuum region "A" while other portions are the atmospheric region "B".

Then operations will be described. When the case 1 is attached to a vacuum chamber, for example, and arms or the like (not shown) are fitted to the first and second rotors 24 and 13, the arms or the like disposed in the rotors 24 and 13 can be freely operated under the vacuum pressure by respectively exiting the stators 22 and 12.

The hollow portion 10 provided in the case 1 may be used for a retracting space of a ball screw and the like.

Since the twin-shaft concentric motor according to the present invention is formed as described above, the following effects can be obtained. That is: since the twin shaft is coaxially aligned rather than the conventional structure arranged in series in the axial direction, the longitudinal length is substantially reduced; since the hollow portion is formed in the axial center, miniaturization can be achieved while a ball screw and the like can be accommodated therein, thereby achieving space saving.

What is claimed is:

1. A twin-shaft concentric motor comprising:
   first and second stators arranged concentrically to each other; and
   first and second rotors formed between the first and second stators and being rotatable independently of each other.

2. A twin-shaft concentric motor according to claim 1, further comprising:
   a first stator partition wall disposed between the first stator and the first rotor;
   a second stator partition wall disposed between the second stator and the second rotor;
   a first rotor partition wall disposed between the first stator and the first rotor; and
   a second rotor partition wall provided between the second stator and the second rotor,
   wherein the partition walls separate a vacuum side from an atmospheric side of the motor, so that the stators are located under atmospheric pressure while the rotors are located under vacuum pressure.

3. A twin-shaft concentric motor according to claim 2, wherein a permanent magnet is provided on a stator-facing surface of each of the rotors.

4. A twin-shaft concentric motor according to claim 2, further comprising first and second detecting means for independently detecting a rotational angle of each of the rotors.

5. A twin-shaft concentric motor according to claim 2, further comprising a case that supports the first and second stators, the case having an axial center,
   wherein a hollow portion is formed in the axial center of the case.

6. A twin-shaft concentric motor according to claim 1, wherein a permanent magnet is provided on a stator-facing surface of each of the rotors.

7. A twin-shaft concentric motor according to claim 6, further comprising first and second detecting means for independently detecting a rotational angle of each of the rotors.

8. A twin-shaft concentric motor according to claim 6, further comprising a case that supports the first and second stators, the case having an axial center,
   wherein a hollow portion is formed in the axial center of the case.

9. A twin-shaft concentric motor according to claim 1, further comprising first and second detecting means for independently detecting a rotational angle of each of the rotors.

10. A twin-shaft concentric motor according to claim 9, wherein the first and second detecting means are formed of code plates disposed in each of the rotors and sensors respectively opposing each of the code plates.

11. A twin-shaft concentric motor according to claim 10, wherein the code plates and the sensors form magnetic encoders.

12. A twin-shaft concentric motor according to claim 11, wherein the code plates are made of a ferromagnetic material and have an anticorrosive coating formed on the surfaces thereof.

13. A twin-shaft concentric motor according to claim 12, further comprising a case that supports the first and second stators, the case having an axial center,
   wherein a hollow portion is formed in the axial center of the case.

14. A twin-shaft concentric motor according to claim 11, further comprising a case that supports the first and second stators, the case having an axial center,
   wherein a hollow portion is formed in the axial center of the case.

15. A twin-shaft concentric motor according to claim 10, further comprising a case that supports the first and second stators, the case having an axial center,
   wherein a hollow portion is formed in the axial center of the case.

16. A twin-shaft concentric motor according to claim 9, further comprising a case that supports the first and second stators, the case having an axial center,
   wherein a hollow portion is formed in the axial center of the case.

17. A twin-shaft concentric motor according to claim 1, further comprising a case that supports the first and second stators, the case having an axial center,
   wherein a hollow portion is formed in the axial center of the case.

18. A twin-shaft concentric motor according to claim 1, wherein the second rotor and second stator constitute an outer-rotor type motor, and the first rotor and first stator constitute an inner-rotor-type motor.

* * * * *